United States Patent [19]
Kong

[11] 3,760,099
[45] Sept. 18, 1973

[54] VIDEO AMPLIFIER FOR A COLOR TELEVISION APPARATUS

[75] Inventor: Victor Kong, Beaverton, Oreg.

[73] Assignee: Tektronix, Inc., Beaverton, Oreg.

[22] Filed: Nov. 1, 1971

[21] Appl. No.: 194,266

[52] U.S. Cl. .......... 178/5.4 R, 178/7.3 R
[51] Int. Cl. .......... H04n 9/12
[58] Field of Search .......... 178/5.4 R, 7.3 R, 178/7.5 R, 6.6 A

[56] References Cited

UNITED STATES PATENTS

| | | | |
|---|---|---|---|
| 3,204,027 | 8/1965 | Clements | 178/7.3 R |
| 3,597,540 | 8/1971 | MacIntyre, Jr. | 178/7.3 R |
| 3,483,318 | 12/1969 | Iwai et al. | 178/6.6 A |

*Primary Examiner*—Richard Murray
*Attorney*—Adrian J. Larue

[57] ABSTRACT

A video amplifier for a color television monitor apparatus or the like is disclosed, wherein the DC level and the gain thereof are automatically adjusted by interposing respectively a black reference pulse and a white reference pulse during the horizontal blanking period of the composite video signal as a pilot signal. The black reference pulse has a predetermined amplitude corresponding to the cut-off voltage of a cathode ray tube. The white reference pulse varies in amplitude according to the setting of the contrast control.

12 Claims, 4 Drawing Figures

INVENTOR:
VICTOR KONG

BY: Adrian J. LaRue
ATTORNEY

INVENTOR:
VICTOR KONG
BY: Adrian J. LaRue
ATTORNEY

VIDEO AMPLIFIER FOR A COLOR TELEVISION APPARATUS

BACKGROUND OF THE INVENTION

The present invention relates to a video amplifier for a color television picture monitor apparatus or the like employing preferably a Trinitron cathode ray tube, wherein each of three identical video amplifiers is precisely controlled in the DC level and the gain so that the optimum picture will be reproduced.

In a color television receiver or a monitor apparatus, there are employed three video output amplifiers for modulating electron beams emitted from red, geeen and blue electron guns according to the input video signal. These three electron beams bombard red, green and blue phosphor dots or lines, respectively for reproducing a color picture on a phosphor screen of a cathode ray tube. It is frequently necessary to control brightness and contrast of the reproduced picture in order to obtain the optimum picture under different ambient conditions. The brightness is a function of the DC level of the signal from these video amplifiers or the visual perception of the average background illumination of the screen. The contrast is the ratio between the background portion and the bright portion and determined by the gain of the amplifiers.

The DC level and the gain of each video output amplifier must change proportionally to those of the other amplifiers in order to maintain the optimum color balance and gray scale tracking. Especially, this is necessary for a Trinitron cathode ray tube in which all grid electrodes of three electron guns are commonly connected to the ground level and a certain negative level during the unblanking and blanking period of the cathode ray tube, respectively. This type of cathode ray tube has differences in electrical characteristics such, for example, as the cut-off voltage and conductance of the electron guns thereof.

Hitherto, a pair of controls, each having three ganged identical potentiometers, are employed for the brightness and contrast controls for respectively controlling the DC level and gain of these amplifiers. This arrangement results in incorrect color balance and gray scale tracking because of nonlinearity and differences of electrical characteristics among these three potentiometers as well as noise and signal delay due to routing the high frequency video signal to these controls normally provided on the front panel. Moreover, there is interaction between the brightness and the contrast controls.

An alternative circuit as disclosed in "The Radio and Electronic Engineer, May, 1969" at pages 299–302 has been proposed for eliminating some of the disadvantages of the abovementioned arrangement, wherein a white reference pulse is interposed at the latter half of the back porch of the composite video signal for controlling the gain of the video output amplifiers. The back porch level is used as a black reference level for controlling the DC level of the video output amplifiers. However, the back porch level of the composite video signal changes depending on the setting of the brightness control, and the brightness and contrast control circuit is very complicated. Moreover, the circuit only works on the unmodulated video signal because of utilizing the back porch clamped. Any video signal from a decorder will introduce error due to the DC level shift during the burst time.

SUMMARY OF THE INVENTION

According to the present invention, the black reference pulse and the white reference pulse are respectively inserted into the former and latter halves of the horizontal blanking period and sampled at the output of each amplifier for controlling respectively the quiescent DC level and the gain of each amplifier. Accordingly, the black and white reference pulses have longer time duration to make the circuit less complicated and more precise.

It is therefore one object of the present invention to provide an improved video output amplifier whose quiescent DC level and gain can automatically be adjusted by the pilot signal interposed into horizontal blanking period.

It is another object of the present invention to provide a video amplifier for a color television apparatus having an accurate gray scale tracking characteristic.

It is still another object of the present invention to provide a video amplifier of less power consumption.

It is a further object of the present invention to provide a video amplifier wherein the brightness and contrast can be adjusted precisely without interaction.

The subject matter of the present invention is particularly pointed out and distinctly claimed in the following description. The invention, however, both as to organization and method of operation, together with further advantages and objects thereof, may best be understood by reference to the following description taken in connection with the accompanying drawings wherein iike references characters refer to like elements.

DETAILED DESCRIPTION OF PREFERRED EMBODIMENT

Figure 1:
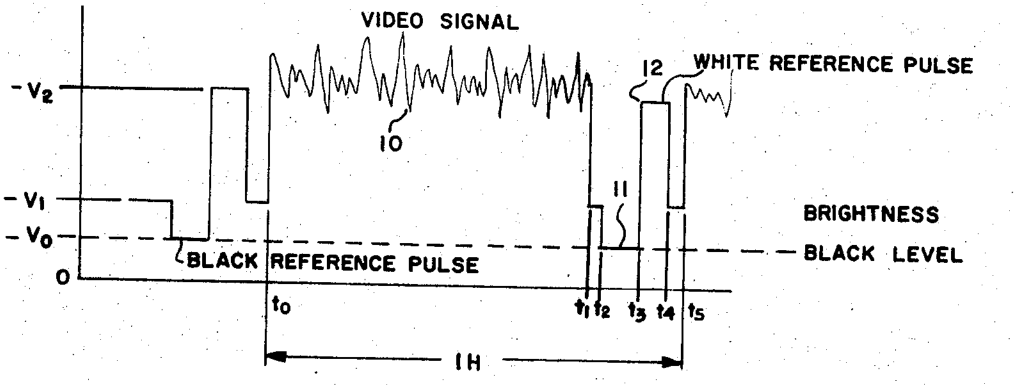
FIG. 1 illustrates one example of a video output waveform applied to a cathode of a cathode ray tube.
Figure 3:
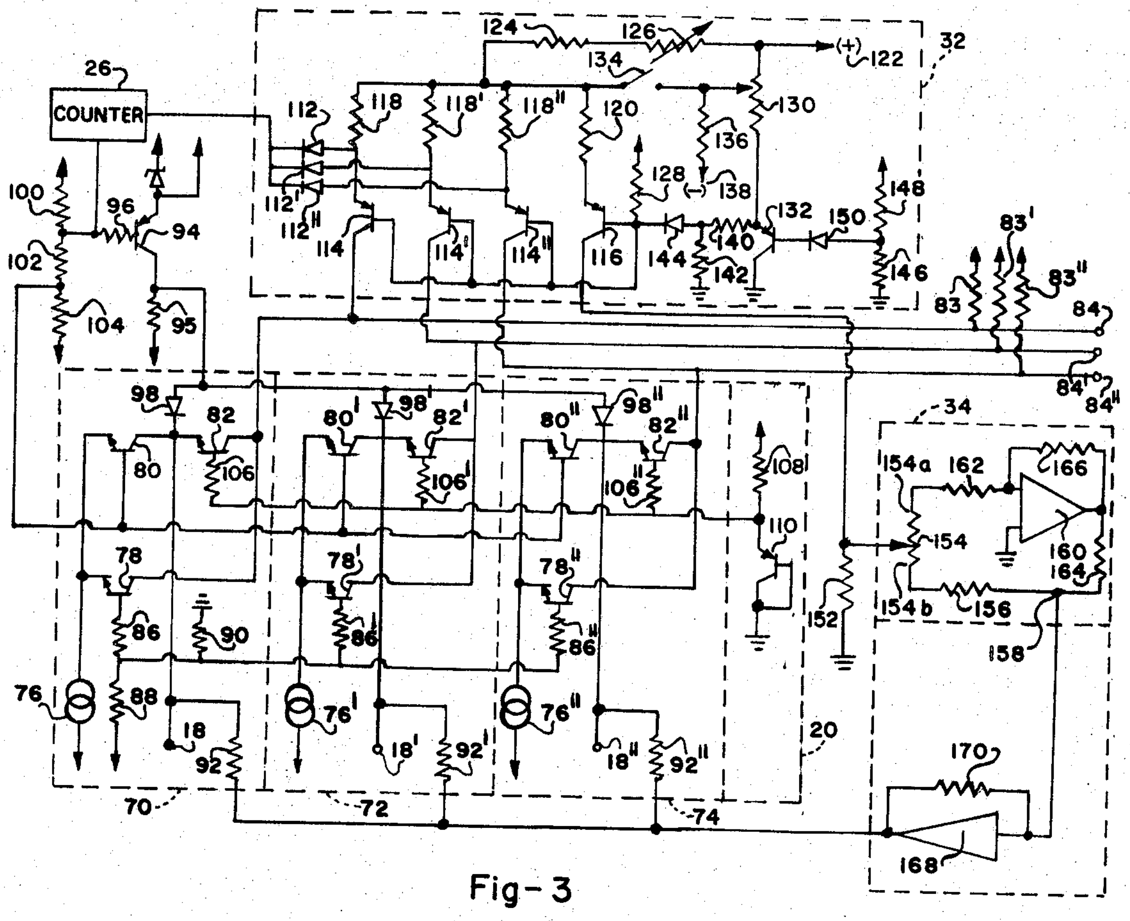
FIG. 3 is a detailed circuit diagram of a preferred embodiment of an important part of FIG. 2.

Referring to the accompanying drawings, FIG. 1 is one example of a video signal at the output terminal of the amplifier having a black reference pulse 11, and a white reference pulse 12 interposed into the horizontal blanking period. The horizontal axis represents time and the vertical axis represents signal amplitude. Video information 10 is transmitted during the time to-t1 when a cathode ray tube (not shown) is unblanked. The retrace period t1–t5 is normally used to transmit a SYNC pulse and a color burst signal for synchronizing a horizontal scanning and a color demodulator respectively, which is normally blanked by applying a negative pulse to the common grid of the electron guns to that no signal during the retrace period t1–t5 can be observed. The black reference pulse 11 and the white reference pulse 12 inserted into the retrace period have respectively an amplitude −vo which correspond to a fixed cut-off level of each electron gun of the cathode ray tube and a controllable amplitude −v2 which changes depending on the setting of a contrast control. The level −v1 represents the background illumination of the screen where no video signal is transmitted and changes depending on the setting of a brightness control. The black reference pulse 11 and the white reference pulse 12 are generated by black and white reference pulse generators respectively whose detailed operation will be made hereinafter together with the circuit thereof referring to FIG. 3.

Figure 2:
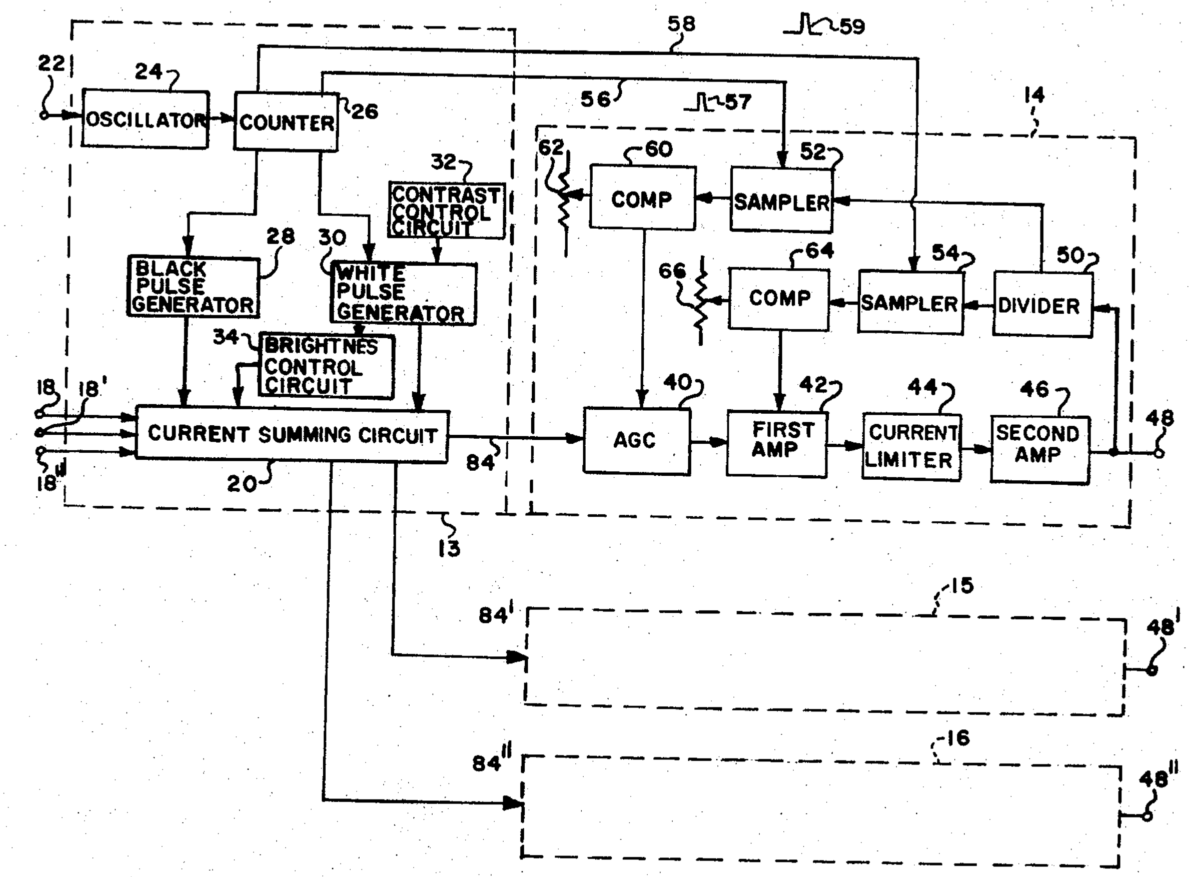
FIG. 2 illustrates a block diagram of one example of a video amplifier according to the present invention.

FIG. 2 illustrates a block diagram of one embodiment of the present invention. The video amplifier consists of a brightness and contrast control circuit 13, and three identical video output amplifiers 14, 15 and 16 for amplifying three video signal components which are applied to the cathode of red, green and blue electron guns of the cathode ray tube respectively. Only one video output amplifier 14 is shown in greater detail in FIG. 2. The red, green and blue video signals are applied to terminals 18, 18' and 18'' of a current summing circuit 20. A gate pulse derived from a horizontal deflection circuit for the cathode ray tube (not shown) is applied to a terminal 22 for actuating an oscillator 24 of conventional design which produces output pulses of, for example, one megahertz in synchronism with the horizontal retrace pulse. A counter 26, including a plurality of conventional counter stages, counts pulses produced from the oscillator 24. When the counter 26 counts a predetermined number, a black reference pulse generator 28 produces a gate pulse which will strip out any video signal during the period t2–t4. During the period t2–t3, a black reference pulse 11 is generated whose amplitude is a fixed value regardless of the setting of the brightness and contrast controls. The black reference pulse generator 28 is then connected to the current summing circuit 20.

Following the black reference pulse, a white reference pulse generator 30 produces a white reference pulse 12 whose amplitude can be controlled by a contrast control circuit 32 including, for example, a potentiometer. The white reference pulse generator 30 is connected to the current summing circuit 20. A brightness control crrcuit 34 is connected to the white reference pulse generator 30 for supplying a brightness control DC current to the current summing circuit 20 during the unblanking period. Although the detailed description of the circuit will be made hereinafter referring to FIG. 3, the brightness control signal is automatically controlled by the setting of the contrast control 32 because the brightness control range is directly proportional to the setting of the contrast control 32. Thus, this circuit arrangement eliminates the interaction between the contrast control 32 and the brightness control 34.

Figure 4:
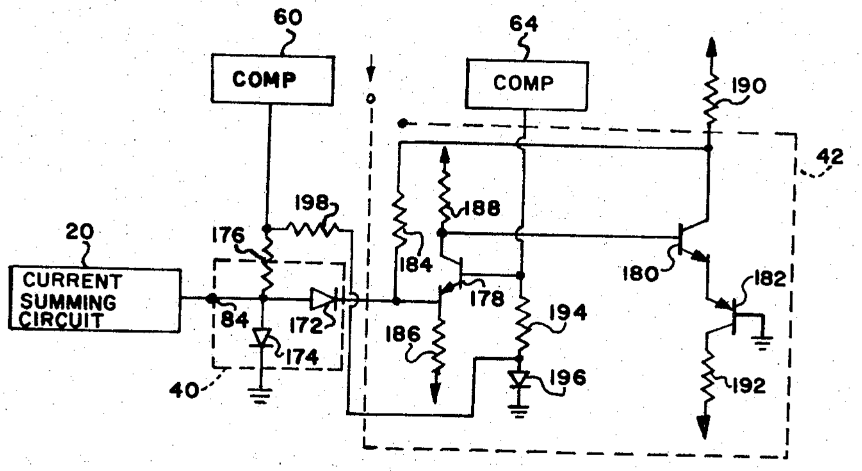
FIG. 4 is a detailed circuit diagram of a preferred embodiment of another important part of FIG. 2.

As it will be clear from FIG. 1, the current summing circuit 20 superimposes the brightness control DC current from the brightness control circuit 34 with each color video signal applied to the terminals 18, 18' and 18'' during the unblanking period to–t1 and substantially the black reference pulse 11 and the white reference pulse 12 are transmitted during the blanking period t1–t5. It should be noted that these three color video signals are translated in the current summing FIG. 4 illustrates a circuit diagram of one preferred embodiment of the DC level and gain control circuit. The AGC circuit 40 consists of a pair of diodes 172 and 174 whose anodes are coupled together with each other to the output terminal 84 of the current summing circuit 20. The diode 172 is connected to the input terminal of thefirst amplifier 42 and the diode 174 is connected to ground. The output video signal from the current summing circuit 20 and the otuput from the comparator 60 are connected to the common junction of the diodes 172 and 174 directly and through a resistor 176 respectively. The first amplifier 42 includes, for example, three DC coupled transistors 178, 180 and 182, The first amplifier 42 i a high open loop gain amplifier having a negative feedback resistor 184 connected between the collector of the transistor 180 and the emitter of the transistor 178. The emitter and collector of the transistor 178 are connected to resistors 186 and 188 respectively. The collector of the transistor 180 is connected to a suitable positive voltage source through a resistor 190. The collector of the grounded base transistor 182 is connected to an output terminal of the first amplifier 42 through a resistor 192.

The output from the comparator 64 is connected to the base of the transistor 178, and the base thereof is also returned to ground through serially-connected resistor 194 and diode 196. The common connection of the resistor 194 and the diode 196 is also connected to the output comparator 60 through a resistor 198 which is the same as the resistor 176. This ensures the correct operation of the first amplifier 42 so that the background signal level or the brightness remains unchanged while changing the contrast of the reproduced picture. Similarly, a pair of identical diodes should be used for the diodes 172 and 174. The output from the collector of the transistor 182 is then applied to the second amplifier 46 through the current limiter 44.

As the first amplifier 42 is a negative feedback amplifier, the current through the diode 172 is maintained at a substantially constant value. Thus, the resistance of the diode 172 is a constant value. On the other hand, the resistance of the diode 174 varies by the current therethrough mainly supplied from the comparator 60. If a gain control current from the comparator 60 increases by adjusting the contrast control potentiometer 130 in FIG. 3, the resistance of the diode 174 decreases and bypasses the signal current from the current summing circuit 20 and vice versa. This decreases the gain of the AGC circuit 40 and, in turn, the overall gain of each video amplifier 14, 15 or 16. Although it is not shown in FIG. 4, the second amplifier 46 is a current-to-voltage converter for producing the output voltage to drive the cathode of the cathode ray tube.

As it will be clear from the above description, the present video amplifier can provide precisely controlled video signals to cathodes of three electron guns for a color television cathode ray tube, especially a Trinitron picture tube. More specifically, the present video amplifier is very simple in construction and easy to operate, and also eliminates the interaction between the contrast and brightness controls.

Although the above description covers a preferred embodiment of the present invention, it is known for those skilled in the art to make various modifications without departing from the spirit and scope of the present invention as defined by the appended claims.

What is claimed is:

1. A video amplifier for a color television apparatus for amplifying a video signal having different intensity levels, comprising:

means for interposing black and white reference pulses into the former and latter halves of the horizontal retrace period respectively to be amplified by the video amplifier with the video signal, sampling means for sampling the peak amplitudes of said black and white reference pulses at the output of the video amplifier, and control means for controlling the DC level and the gain of the video amplifier according to the outputs from said sampling means.

2. A video amplifier according to claim 1, wherein said black reference pulse has a predetermined amplitude corresponding to the cut-off voltage of each electron gun of a picture tube, and said white reference pulse has a controllable amplitude which changes depending on the setting of a contrast control.

3. A video amplifier according to claim 1, wherein said menas for interposing said black and white reference pulses includes:

a counter for counting a clock pulse of a given frequency generated upon receiving a horizontal gate pulse, and three identical current summing circuits for interposing said black and white reference pulses into the horizontal retrace period under control of said counter.

4. A video amplifier according to claim 1, wherein said control means includes comparator means for comparing the samples from said sampling means with a controllable reference signal so as to compnesate for differences in electrical characteristics of each electron gun and also of different picture tubes.

5. A video amplifier for a color television apparatus for amplifying a video signal having different intensity levels between black and white levels having brightness and contrast controls, comprising:

three identical DC coupled video amplifiers for amplifying three color video signal components at a controllable gain and a fixed quiescent DC level, a black reference pulse generator for generating a black reference pulse of fixed amplitude corresponding to the cut-off voltage of the electron guns of the picture tube, current summing means for inserting said black and white reference pulses into the horizontal retrace period to apply said reference pulses together withthe three video signals to said three video amplifiers, and for superimposing the three color video signals with the brightness control signal, sampling means for sampling said black and white reference pulses transmitted to the output terminl of the video amplifier, and control means for controlling the DC level and gain of each video amplifier by samples of said black and white reference pulses respectively.

6. A video amplifier according to claim 5, wherein said white reference pulse generator includes a circuit for generating a DC signal corresponding to the amplitude of said whire reference pulse, which is applied to the brightness control in order to eliminate the interaction between the contrast and brightness controls, controlling the brightness control range.

7. A video amplifier for a color television apparatus according to claim 5, said current summing means, comprising:

a current source, first and second transistors connected in seies between said current source and said white referencepulse generator, the common junction of said first and second transistors being connected to the video signal, and third transistor connected in parallel with said first and second transistors.

8. A video amplifier for a color television apparatus according to claim 7 wherein said first and second transistors are turned off while said white reference pulse generator is generating the white reference pulse.

9. A brightness and contrast control circuit for a TV apparatus comprising:

means for controlling the contrast of the TV apparatus, means for controlling the brightness of the TV apparatus including a pair of signal paths defining resistance means and amplifier means, and means for receiving a control signal relating to said frist mentioned means to provide the control signal to both of said signal paths in a selectable different proportion.

10. A brightness and contrast circuit according to claim 9 wherein said means for receiving a control signal is a potentiometer connected at a movable top thereof to said first mentioned means and at both fixed terminals to said amplifier means and resistance means.

11. A brightness and contrast circuit according to claim 10 wherein said amplifier means is an operational amplifier including input resistor means, a feedback resistor and output resistor means.

12. A brightness and contrast circuit according to claim 11 wherein said resistor means are substantially the same resistive value and said brightness control means includes second operational amplifier means whose input is connected to the output terminal of said pair of signal path.

* * * * *

UNITED STATES PATENT OFFICE
CERTIFICATE OF CORRECTION

Patent No. 3,760,099 Dated September 18, 1973

Inventor(s) Victor Kong

It is certified that error appears in the above-identified patent and that said Letters Patent are hereby corrected as shown below:

Column 1, line 14, "geeen" should read -- green --. Column 2, line 32, "iike" should read -- like --. Cancel columns 3 through 6 and insert the corrected columns 3 through 10, as part of Letters Patent.

Signed and sealed this 25th day of June 1974.

(SEAL)
Attest:

EDWARD M.FLETCHER,JR.
Attesting Officer

C. MARSHALL DANN
Commissioner of Patents